United States Patent
Jacoby et al.

(10) Patent No.: US 10,916,271 B1
(45) Date of Patent: Feb. 9, 2021

(54) ELIMINATING LEAD SCREW HYSTERESIS FOR VERTICALLY TRANSLATING LOAD/UNLOAD RAMP MECHANISM FOR DATA STORAGE DEVICE

(71) Applicant: Western Digital Technologies, Inc., San Jose, CA (US)

(72) Inventors: Jon Jacoby, San Jose, CA (US); David K. Myers, Campbell, CA (US); Jon M. Garbarino, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/912,514

(22) Filed: Jun. 25, 2020

(51) Int. Cl.
    *G11B 21/22* (2006.01)
    *G11B 21/12* (2006.01)
    *G11B 5/54* (2006.01)
    *G11B 5/48* (2006.01)

(52) U.S. Cl.
    CPC ............ *G11B 21/22* (2013.01); *G11B 5/4813* (2013.01); *G11B 5/54* (2013.01); *G11B 21/12* (2013.01)

(58) Field of Classification Search
    CPC ........... G11B 21/22; G11B 21/12; G11B 5/54; G11B 5/4813
    USPC .............................................. 360/254–254.5
    See application file for complete search history.

(56) References Cited

U.S. PATENT DOCUMENTS

| | | | |
|---|---|---|---|
| 2,578,221 A | * | 12/1951 | Bodmer .................. B23G 1/04 470/176 |
| 3,134,097 A | | 5/1964 | Stevens et al. |
| 3,172,082 A | | 3/1965 | Dirks |
| 3,311,902 A | | 3/1967 | Appleton |
| 3,505,060 A | | 3/1970 | Goddard et al. |
| 3,940,794 A | | 2/1976 | Griffiths et al. |
| 4,164,767 A | | 8/1979 | Gyi et al. |
| 4,208,685 A | | 6/1980 | Matla et al. |
| 4,566,087 A | | 1/1986 | Kraft |
| 4,742,410 A | | 5/1988 | Smith |
| 4,839,758 A | | 6/1989 | Honjoh |
| 4,884,261 A | | 11/1989 | Dalziel |
| 5,023,737 A | | 6/1991 | Yaeger |
| 5,283,705 A | | 2/1994 | Iwabuchi |
| 5,307,224 A | | 4/1994 | Minase |
| 5,347,414 A | | 9/1994 | Kano |
| 5,467,238 A | | 11/1995 | Lee et al. |
| 5,550,695 A | | 8/1996 | Matsumoto |
| 5,831,795 A | | 11/1998 | Ma et al. |
| 5,875,074 A | | 2/1999 | Ho et al. |

(Continued)

OTHER PUBLICATIONS

International Business Machines Corporation, IBM Customer Engineering Manual of Instruction, RAMAC 305, copyright 1958, 1959 by International Business Machines Corporation, 253 pages.

*Primary Examiner* — Allen T Cao

(74) *Attorney, Agent, or Firm* — John D. Henkhaus

(57) ABSTRACT

An approach to a reduced-head hard disk drive (HDD) includes a load/unload (LUL) ramp subsystem that includes a translatable ramp assembly that includes a biasing member and a magnet coupled thereto, which is magnetically engaged with a guide post to provide a bias force at an interface of a lead screw and the ramp assembly. The bias force acts upon the interface by reducing a gap between outer threads of the lead screw and inner threads of a mating threaded interface structure of the ramp assembly that would otherwise cause lead screw hysteresis without the bias force.

13 Claims, 6 Drawing Sheets

(56) References Cited

U.S. PATENT DOCUMENTS

| | | |
|---|---|---|
| 6,057,988 A | 5/2000 | Berberich et al. |
| 6,212,045 B1 | 4/2001 | Guzik |
| 6,452,753 B1 | 9/2002 | Hiller et al. |
| 6,473,268 B2 | 10/2002 | Simozato |
| 6,473,270 B1 | 10/2002 | McDonald et al. |
| 6,480,361 B1 | 11/2002 | Patterson |
| 6,693,773 B1 | 2/2004 | Sassine |
| 7,548,399 B2 | 6/2009 | Shin |
| 7,813,078 B1 | 10/2010 | Gleason et al. |
| 7,986,491 B2 | 7/2011 | Albrecht et al. |
| 8,035,913 B2 | 10/2011 | Kim et al. |
| 8,112,580 B2 | 2/2012 | Bandic et al. |
| 8,208,215 B2 | 6/2012 | Molaro et al. |
| 8,824,094 B1 | 9/2014 | Furlong et al. |
| 8,958,172 B1 | 2/2015 | Hansen |
| 8,958,173 B1 | 2/2015 | Hirano et al. |
| 9,025,277 B1 | 5/2015 | Hirano |
| 9,183,862 B1 | 11/2015 | Shah et al. |
| 9,218,833 B1 | 12/2015 | Shah et al. |
| 9,552,835 B1 | 1/2017 | Tamayo et al. |
| 9,704,521 B1 | 7/2017 | Shah et al. |
| 10,269,380 B1 | 4/2019 | Sun et al. |
| 2002/0067685 A1 | 7/2002 | Bae et al. |
| 2005/0280945 A1 | 12/2005 | Duvall et al. |
| 2005/0286153 A1 | 12/2005 | Brooks et al. |
| 2005/0286171 A1 | 12/2005 | Kim et al. |
| 2006/0002028 A1 | 1/2006 | Nayar et al. |
| 2006/0117558 A1 | 6/2006 | Koh et al. |
| 2006/0171078 A1 | 8/2006 | Kajitani |
| 2006/0256478 A1 | 11/2006 | Hayakawa |
| 2007/0008653 A1 | 1/2007 | Ohno et al. |
| 2009/0279199 A1 | 11/2009 | Zhang |
| 2010/0091408 A1 | 4/2010 | Albrecht et al. |
| 2012/0002328 A1 | 1/2012 | Aoki et al. |
| 2019/0147909 A1 | 5/2019 | Sun et al. |
| 2019/0333533 A1 | 10/2019 | Mendonsa et al. |
| 2020/0027479 A1 | 1/2020 | Myers et al. |

\* cited by examiner

ELIMINATING LEAD SCREW HYSTERESIS FOR VERTICALLY TRANSLATING LOAD/UNLOAD RAMP MECHANISM FOR DATA STORAGE DEVICE

FIELD OF EMBODIMENTS

Embodiments of the invention may relate generally to a reduced-head hard disk drive having an actuator elevator mechanism and particularly to approaches to eliminating lead screw hysteresis in the context of a vertically translating load/unload ramp mechanism.

BACKGROUND

There is an increasing need for archival storage. Tape is a traditional solution for data back-up, but is very slow to access data. Current archives are increasingly "active" archives, meaning some level of continuing random read data access is required. Traditional hard disk drives (HDDs) can be used but cost may be considered undesirably high. Other approaches considered may include HDDs with extra large diameter disks and HDDs having an extra tall form factor, with both requiring large capital investment due to unique components and assembly processes, low value proposition in the context of cost savings, and barriers to adoption in the marketplace due to uniquely large form factors, for example.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DESCRIPTION

Figure 1:
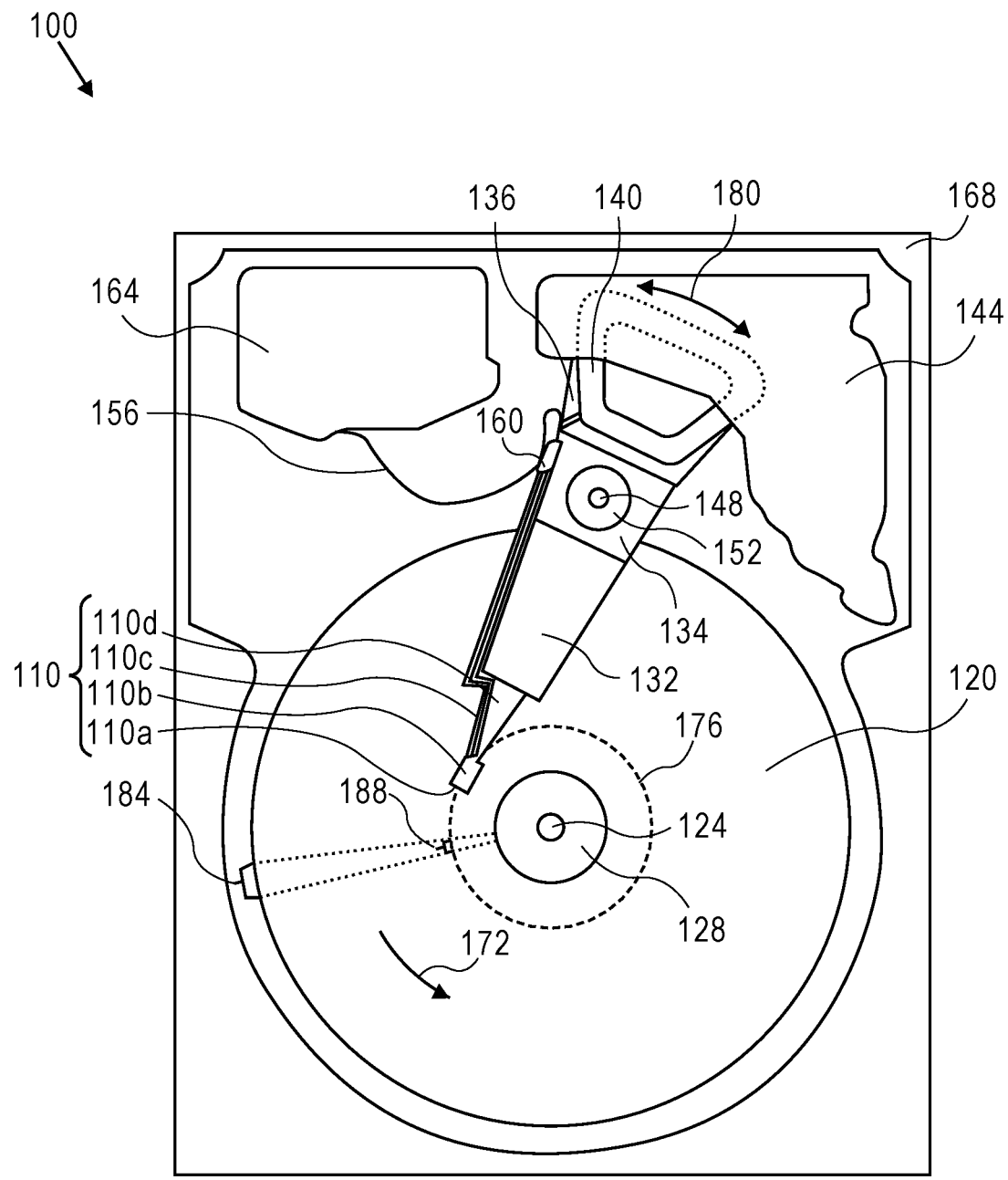
FIG. 1 is a block diagram illustrating a data storage system architecture, according to an embodiment.

Generally, approaches to a hard disk drive having a translating ramp mechanism are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instance of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that there is an increasing need for cost effective "active" archival storage (also referred to as "cold storage"), preferably having a conventional form factor and utilizing many standard components. One approach involves a standard HDD form factor (e.g., a 3.5" form factor) and largely common HDD architecture, with n disks in one rotating disk stack, but containing fewer than 2n read-write heads, according to embodiments. Such a storage device may utilize an articulation mechanism that can move the heads to mate with the different disk surfaces (for a non-limiting example, only 2 heads but 5+ disks for an air drive or 8+ disks for a He drive), where the primary cost savings may come from eliminating the vast majority of the heads in the drive.

Ramp load/unload (LUL) technology involves a mechanism that assists the movement of the head stack assembly (HSA), including the read-write head sliders, away from and off the disks and safely positions them onto a cam-like structure. The cam typically includes a shallow ramp on the side closest to the disk. During a power-on sequence, for example, the read-write heads are loaded by moving the sliders off the ramp and over the disk surfaces when the disks reach the appropriate rotational speed. Thus, the terminology used is that the sliders or HSA are "loaded" to or over the disk (i.e., off the ramp) into an operational position, and "unloaded" from the disk (i.e., "parked" onto the ramp)

such as in an idle position. In the context of a multi-disk HDD having an actuator elevator mechanism, in order to move the heads up and down to different disks the heads need to be backed off the ramp and then re-engaged to the ramp at the next disk location.

Translating Load/Unload Ramp Assembly for Reduced-Head Hard Disk Drive

One approach to a LUL ramp in the context of a reduced-head HDD is to employ a translating ramp system (e.g., vertically translating) for moving a ramp assembly or unit, in coordination and synchronization with moving the actuator assembly, along a plurality of recording disks, i.e., the "disk stack", so that the read-write heads can load and unload from the ramp assembly under the operation of the actuator assembly. One example of such a LUL ramp system is as follows.

Figure 2A:
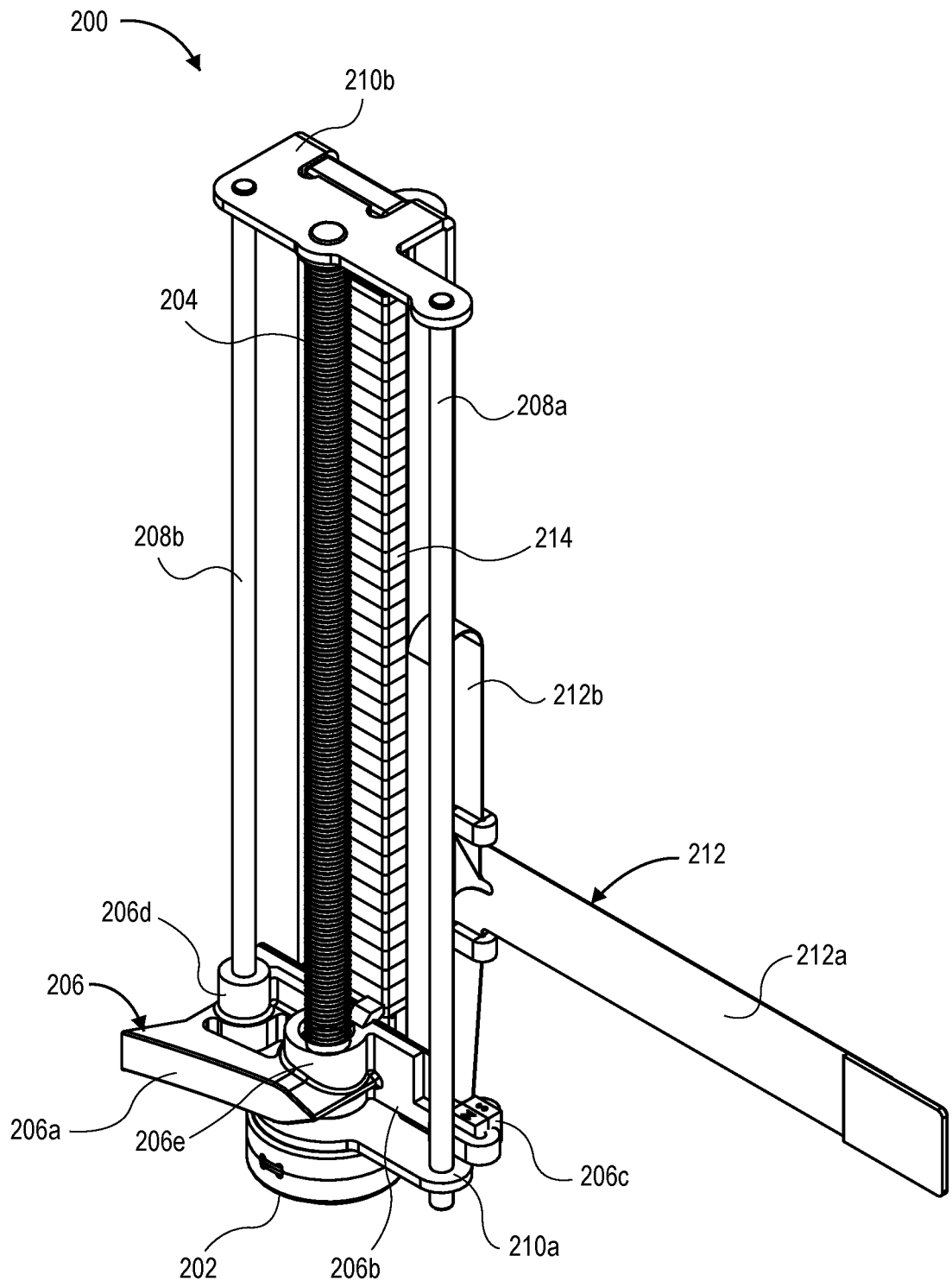
FIG. 2A is perspective view illustrating a translating load/unload ramp system in a first position, according to an embodiment.
Figure 2B:
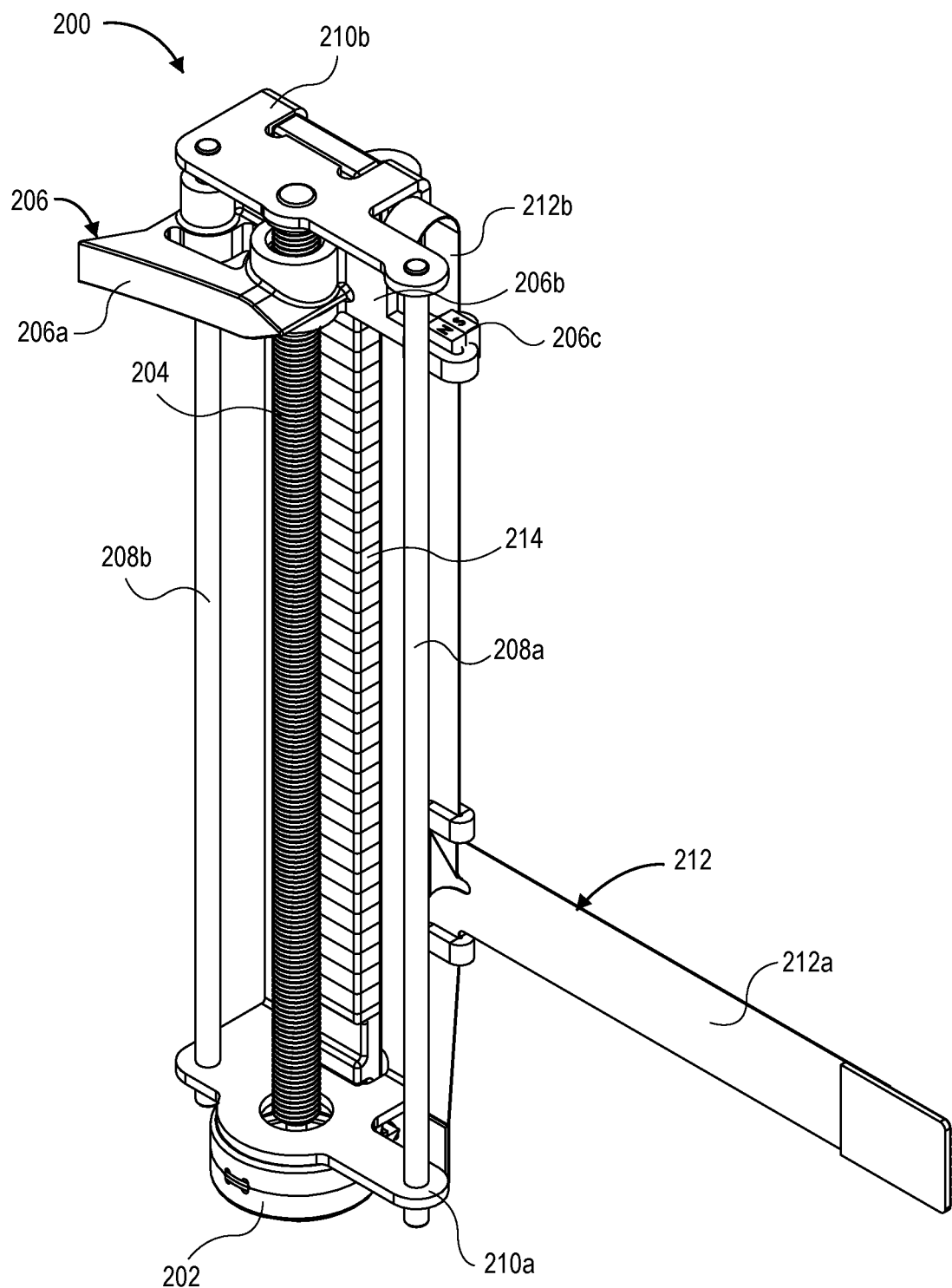
FIG. 2B is perspective view illustrating the translating load/unload ramp system of FIG. 2A in a second position, according to an embodiment.

FIG. 2A is perspective view illustrating a translating load/unload ramp system in a first position, and FIG. 2B is perspective view illustrating the translating load/unload ramp system of FIG. 2A in a second position, both according to embodiments. FIGS. 2A, 2B illustrate a ramp system 200 comprising a motor 202 positioned and configured to drive rotation of a lead screw 204, which in turn drives translation of a ramp assembly 206 along the axis of the lead screw 204. According to an embodiment, the motor 202 comprises a stepper motor. Responsive to rotation of the lead screw 204 driven by the motor 202, the ramp assembly 206 translates (shown here in this orientation as vertically translating, or up and down) along a guide post 208a and a guide post 208b which are positioned parallel with the lead screw 204. According to an embodiment, the guide posts 208a, 208b interconnect a lower bracket 210a and an upper bracket 210b. As depicted in FIGS. 2A, 2B, the lead screw may extend through the lower bracket 210a and may be coupled with (rotatably) the upper bracket 210b. Ramp system 200 further comprises a flexible cable assembly (FCA) 212 (or flexible printed circuit (FPC)), shown comprising two portions, e.g., (i) a first portion 212a depicted as generally horizontal leading or extending to an electrical connector or junction, or electronic circuit, or the like, and onward to some form of controller electronics, and (ii) a second portion 212b electrically coupled with the first portion 212a and configured for electrical connecting at least with the motor 202 and the ramp assembly 206 and any other electronic circuitry or board that may be implemented (e.g., a circuit board for the sensor 216 of FIG. 4B). The second portion 212b of FCA 212 is configured to have enough slack (e.g., a vertical loop) to reposition in coordination or in response to the various positions of the ramp assembly 206. FIG. 2A depicts the ramp assembly 206 in a first (low) position with the second portion 212b of the FCA 212 doubled back on itself, and FIG. 2B depicts the ramp assembly 206 in a second (high) position with the second portion 212b fully or near fully extended. A proximity sensing system for position sensing of the ramp assembly 206 and driver feedback purposes may be included and configured to sense the Z-position (e.g., vertical height) of the ramp assembly 206. The type/form of sensing mechanism used may vary from implementation to implementation. However, according to an embodiment, sensing is based on the position of the ramp assembly 206 relative to a magnetic encoding strip 214 located proximally to at least one corresponding position sensor 216 (FIG. 4B), such as a Hall effect sensor, mounted on the ramp assembly 206.

According to an embodiment, ramp assembly 206 comprises a LUL ramp member 206a (or "ramp unit") movably engaged with guide post 208b via a non-threaded interface structure 206d and engaged with the lead screw 204 via a mating threaded interface structure 206e. Ramp assembly 206 further comprises a biasing member 206b (or "biasing unit") extending from the threaded interface structure 206e of the ramp assembly 206, and a magnet 206c coupled with the biasing member 206b and magnetically engaged with guide post 208a to provide a constant bias force at or to the interface of the lead screw 204 and the threaded interface structure 206e of the ramp assembly 206 and over the entire stroke of the translatable ramp assembly 206, as explained in more detail elsewhere herein. The bias force acts radially upon the interface by reducing a gap between outer threads of the lead screw and inner threads of the mating threaded interface structure of the ramp assembly that would otherwise be present without the bias force.

Lead Screw Hysteresis

Figure 3A:
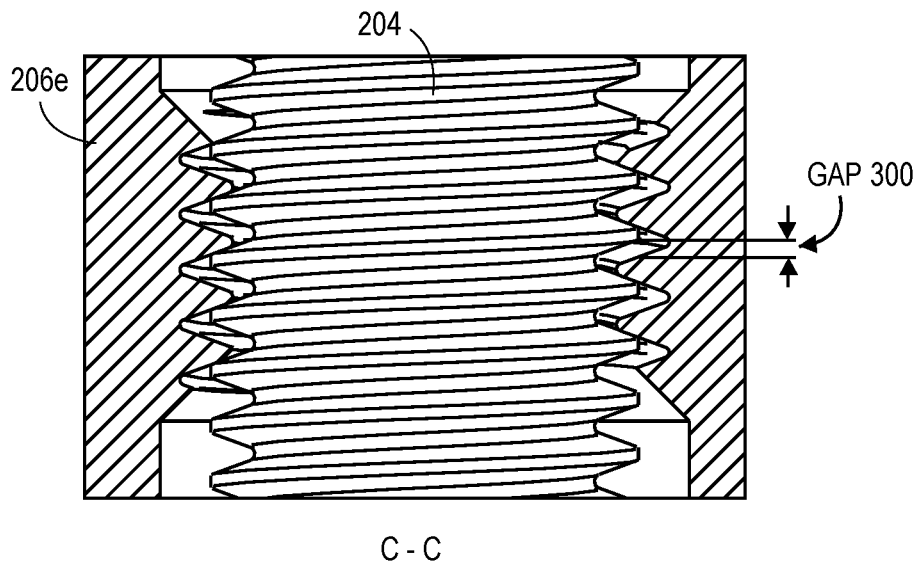
FIG. 3A is a cross-sectional side view illustrating mating threads of the load/unload ramp system of FIG. 2A without an applied bias force, according to an embodiment.
Figure 3B:
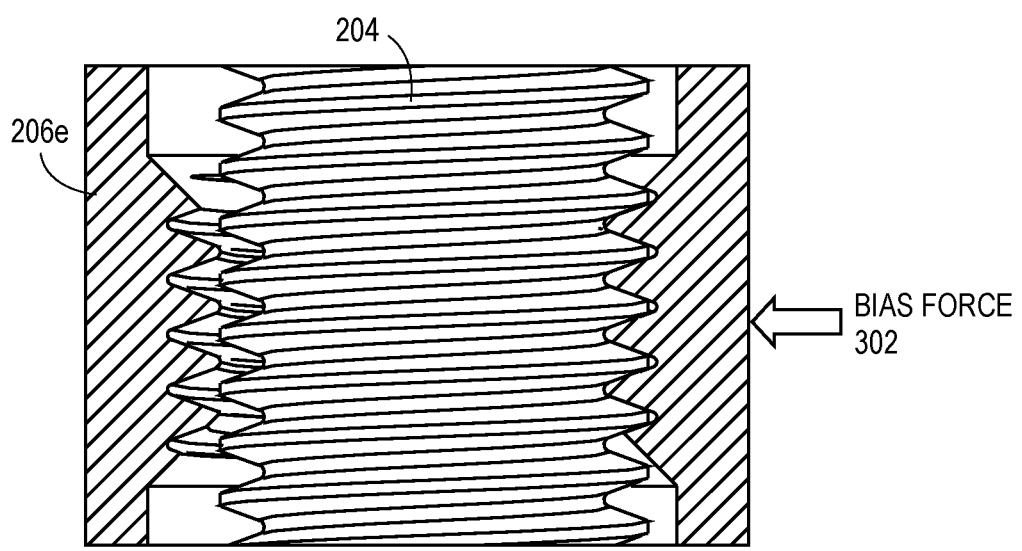
FIG. 3B is a cross-sectional side view illustrating mating threads of the load/unload ramp system of FIG. 3A with an applied bias force, according to an embodiment.

FIG. 3A is a cross-sectional side view illustrating mating threads of the load/unload ramp system of FIG. 2A without an applied bias force, and FIG. 3B is a cross-sectional side view illustrating mating threads of the load/unload ramp system of FIG. 3A with an applied bias force, both according to embodiments. With reference first to FIG. 3A, a portion of the lead screw 204 is depicted interposed within the threaded interface structure 206e of the ramp assembly 206. As illustrated, in an unbiased state in which no bias force is intentionally applied, a gap 300 exists between the outer threads of the lead screw 204 and the inner threads of the threaded interface structure 206e, such as for clearances that allow for assembly of the sub-components. Here, the gap 300 is depicted as occurring below the outer threads of the lead screw, such as after the threaded interface structure 206e has been driven upward. Likewise, a similar gap as gap 300 would occur above the outer threads of the lead screw after the threaded interface structure 206e has been driven downward. Thus, with any change in direction of the ramp assembly 206 the lead screw 204 needs to first rotate some amount to take up or bridge the gap 300 before fully engaging with the threads of the threaded interface structure 206e, while achieving no vertical motion of the ramp assembly 206. Such rotation of the lead screw 204 without corresponding or responsive translation of the ramp assembly 206 is what is referred to herein as "lead screw hysteresis", and is considered an undesirable phenomenon in the context of servoing and the response time of the ramp assembly 206, for examples.

With reference now to FIG. 3B, the same portion of the lead screw 204 is depicted interposed within the threaded interface structure 206e of the ramp assembly 206, in a biased state in which a bias force 302 is intentionally applied to the interface of the lead screw 204 and threaded interface structure 206e of the ramp assembly 206. As illustrated and in comparison with the interface of FIG. 3A, no gap such as the gap 300 now exists between the outer threads of the lead screw 204 and the inner threads of the threaded interface structure 206e, e.g., the threads of the lead screw 204 and the threads of the threaded interface structure 206e are fully or near fully engaged. Hence, the lead screw hysteresis is effectively, substantially reduced or minimized, if not eliminated completely, along with the undesirable effects of such hysteresis.

Load/Unload Ramp Assembly with Biasing Member

Figure 4A:
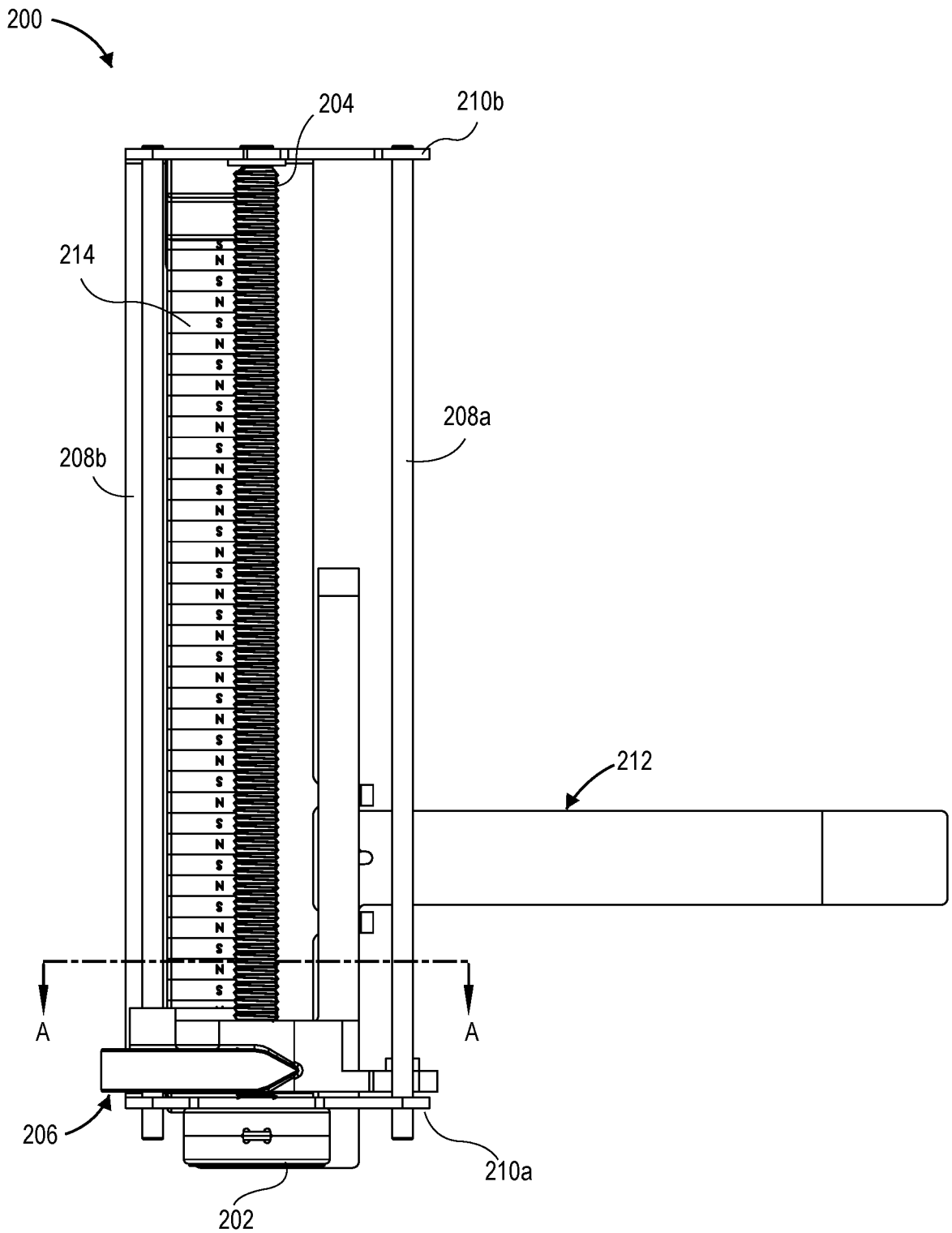
FIG. 4A is a front view illustrating the translating load/unload ramp system of FIG. 2A, according to an embodiment.

FIG. 4A is a front view illustrating the translating load/unload ramp system of FIG. 2A, according to an embodiment. Thus, FIG. 4A again depicts the ramp system 200 comprising the motor 202, for driving the lead screw 204, for translating the ramp assembly 206 along the guide posts 208a 208b. A cross-section cut line A-A is depicted, with section A-A illustrated in reference to FIG. 4B.

Figure 4B:
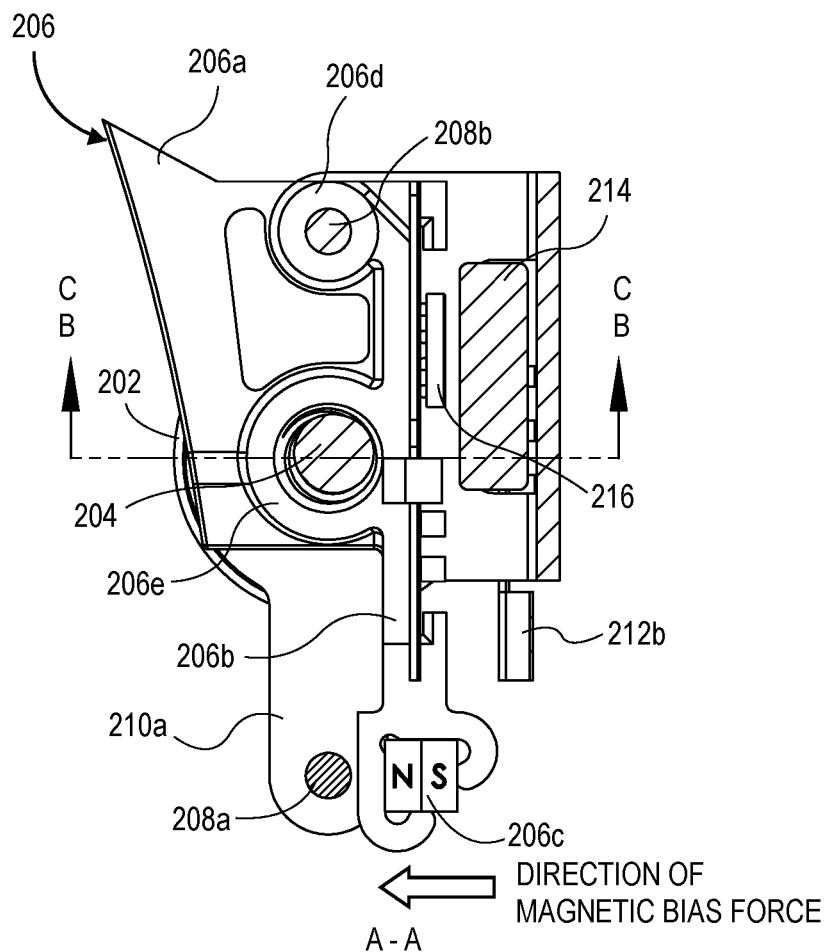
FIG. 4B is a plan view illustrating a load/unload ramp assembly, according to an embodiment.

FIG. 4B is a plan view illustrating a load/unload ramp assembly, according to an embodiment. A cross-section cut line B-B is depicted, with section B-B illustrated in reference to FIG. 3B in a biased state, as depicted in FIG. 4B. A similar cross-section cut line C-C is depicted, with section C-C illustrated in reference to FIG. 3A in an unbiased state. As illustrated and described in reference to FIGS. 2A, 2B and illustrated in a plan view here, ramp assembly 206 comprises the LUL ramp member 206a (or "ramp unit") movably engaged with the guide post 208b via the non-threaded interface structure 206d and engaged with the lead screw 204 via the mating threaded interface structure 206e, and the biasing member 206b (or "biasing unit") extending from the threaded interface structure 206e along with the coupled magnet 206c for magnetically engaging with the guide post 208a to provide the bias force at or to the interface of the lead screw 204 and the threaded interface structure 206e as illustrated and described in reference to FIGS. 3A, 3B. According to an embodiment, the guide post 208a is composed of a magnetic material, thus enabling the magnetic attraction or interaction with the magnet 206c of the ramp assembly 206 to generate the biasing force applied to the interface. As depicted and according to an embodiment, the biasing member 206b extends from the threaded interface structure 206e at a proximal end of the biasing member 206b, and the magnet 206c is mechanically coupled with the biasing member 206b at a distal end of the biasing member 206b.

Physical Description of an Illustrative Operating Context

Embodiments may be used in the context of a multi-disk, reduced read-write head, digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110*a* of the HGA 110 reads the servo-burst-signal pattern, which provides a position-error-signal (PES) to the servo electronics, which controls the electrical signal provided to the voice coil 140 of the VCM, thereby enabling the head 110*a* to follow the track 176. Upon finding the track 176 and identifying a particular sectored track portion 188, the head 110*a* either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A vertically-translatable load/unload (LUL) ramp system for a reduced-head hard disk drive (HDD), the system comprising:
   a motor configured to drive rotation of a lead screw to drive translation of a ramp assembly along an axis of the lead screw;
   a plurality of guide posts positioned parallel with the lead screw and along which the ramp assembly translates;
   the ramp assembly comprising:
      a LUL ramp member movably engaged with a first guide post of the plurality of guide posts and engaged with the lead screw via a mating threaded interface structure;
      a biasing member extending from the threaded interface structure of the LUL ramp member; and
      a magnet coupled with the biasing member and magnetically engaged with a second guide post of the plurality of guide posts to provide a bias force at an interface of the lead screw and the threaded interface structure.

2. The ramp system of claim 1, wherein the bias force acts upon the interface by reducing a gap between outer threads of the lead screw and inner threads of the mating threaded interface structure of the ramp assembly that would otherwise be present without the bias force.

3. The ramp system of claim 1, wherein the second guide post is composed of a magnetic material.

4. The ramp system of claim 1, wherein the plurality of guide posts interconnect an upper bracket and a lower bracket.

5. The ramp system of claim 1, wherein a non-threaded interface structure of the LUL ramp member is positioned around the first guide post to movably engage with the first guide post.

6. The ramp system of claim 1, wherein:
   the biasing member extends from the threaded interface structure of the LUL ramp member at a proximal end of the biasing member; and
   the magnet is coupled with the biasing member at a distal end of the biasing member.

7. A hard disk drive comprising the ramp system of claim 1.

8. A reduced-head hard disk drive (HDD) comprising:
   a plurality of n recording disk media rotatably mounted on a spindle;
   a plurality of less than 2n head sliders each comprising a read-write transducer configured to read from and to write to at least two disk media of the plurality of disk media;
   an actuator assembly configured to move the plurality of head sliders to access portions of the at least two disk media; and
   a load/unload ramp system comprising:

a motor configured to drive rotation of a lead screw to drive translation of a ramp assembly along an axis of the lead screw;

a plurality of guide posts positioned parallel with the lead screw and along which the ramp assembly translates;

the ramp assembly comprising:

a LUL ramp unit movably engaged with a first guide post of the plurality of guide posts and engaged with the lead screw via a mating threaded interface structure, a biasing unit extending from the threaded interface structure of the LUL ramp unit, and a magnet coupled with the biasing unit and magnetically engaged with a second guide post of the plurality of guide posts to provide a bias force at an interface of the lead screw and the threaded interface structure; and wherein the bias force acts upon the interface by reducing any gap between outer threads of the lead screw and inner threads of the mating threaded interface structure of the ramp assembly that would otherwise be present without the bias force.

9. The HDD of claim 8, wherein the second guide post of the ramp assembly is composed of a magnetic material.

10. The HDD of claim 8, wherein the plurality of guide posts of the ramp assembly interconnect an upper bracket and a lower bracket.

11. The HDD of claim 8, wherein a non-threaded interface structure of the LUL ramp unit is positioned around the first guide post to movably engage with the first guide post.

12. The HDD of claim 8, wherein:

the biasing unit of the ramp assembly extends from the threaded interface structure of the LUL ramp unit at a proximal end of the biasing unit; and the magnet of the ramp assembly is coupled with the biasing unit at a distal end of the biasing unit.

13. A reduced-head hard disk drive (HDD), comprising:

recording means for storing digital information;

reading/writing means for reading from and writing to the recording means;

loading/unloading means for loading the reading/writing means to access the recording means and unloading the reading/writing means from access to the recording means; and translating means for translating the loading/unloading means from one recording means to another recording means;

wherein the loading/unloading means comprises means for reducing hysteresis associated with the translating means.

* * * * *